United States Patent
Lim

(10) Patent No.: US 6,503,130 B2
(45) Date of Patent: Jan. 7, 2003

(54) PROTECTIVE FILM SEPARATOR IN SEMICONDUCTOR WAFER GRINDING PROCESS

(75) Inventor: Sang Soon Lim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/036,404

(22) Filed: Jan. 7, 2002

(65) Prior Publication Data

US 2002/0094760 A1 Jul. 18, 2002

(30) Foreign Application Priority Data

Jan. 17, 2001 (KR) .............................................. 01-2681

(51) Int. Cl.[7] .................................................. B24B 5/00
(52) U.S. Cl. ........................ 451/285; 451/456; 156/344
(58) Field of Search ........................ 451/41, 285, 287, 451/288, 289, 56, 456; 156/344; 269/762, 21

(56) References Cited

U.S. PATENT DOCUMENTS

| | | | | |
|---|---|---|---|---|
| 4,828,640 A | * | 5/1989 | Kaya et al. ................. | 156/248 |
| 5,268,065 A | * | 12/1993 | Grupen-Shemansky ..... | 156/630 |
| 6,159,827 A | * | 12/2000 | Kataoka et al. ............. | 438/464 |
| 6,202,292 B1 | * | 3/2001 | Farnworth et al. ............ | 29/743 |
| 6,273,791 B1 | * | 8/2001 | Kataoka et al. ................ | 451/41 |
| 6,436,226 B1 | * | 8/2002 | Omni et al. ................. | 156/344 |

* cited by examiner

Primary Examiner—Eileen P. Morgan
(74) Attorney, Agent, or Firm—Lee & Sterba, P.C.

(57) ABSTRACT

A protective film separator comprising an adsorption means and a peeling means for removing the protective film in a semiconductor wafer backside grinding process. The adsorption means uses a vacuum to separate a part of a protective film adhered to an electrical circuit patterned side of a wafer from the patterned side of the wafer. The peeling means presses each side of the part of the protective film separated from the wafer by the adsorption means, and separates unpeeled parts thereof from the patterned side of the wafer.

The protective film separator of the present invention reduces costs and expenses for raw materials by eliminating the need for extra removing tape or heat-activated adhesive tape. The present invention may also improve semiconductor yields by reducing the external force applied to a wafer during removal of the protective film, thereby allowing better protection from impurities.

6 Claims, 5 Drawing Sheets

PROTECTIVE FILM SEPARATOR IN SEMICONDUCTOR WAFER GRINDING PROCESS

BACKGROUND OF THE INVENTION

1. Field of the Invention

The present invention relates to a protective film separator in a semiconductor wafer grinding process, and more particularly, to a separator for removing a protective film affixed to an electric circuit patterned side of a wafer to protect the wafer in a semiconductor wafer grinding process.

2. Description of Related Art

After completing an electric circuit patterning process to a side of a wafer in a semiconductor process, the other side of the wafer is generally ground in a wafer grinding process.

The wafer grinding process polishes the backside of a wafer and removes a polysilicon layer or an oxide layer that is adhered to the backside of the wafer while the semiconductor process is performed. In addition, the wafer grinding process abrades the backside of a wafer making a thinner wafer, which results in simultaneous improvement in both electric and heat conductivity of a semiconductor device.

Because such a wafer grinding process generates many impurities, a wafer protective film is adhered to the patterned side of a wafer so that the impurities do not cause damage to the electric circuit patterned side of the wafer.

The adhered protective film is removed after completing the wafer grinding process by a protective film separator. Conventionally, two types of protective film separators have generally been used.

The first type of protective film separator attaches an extra removing tape to the adhered protective film and simultaneously irradiates ultraviolet rays to weaken an adhesive strength of the adhered protective film. Then, a roller presses the wafer surface and rotates continuously on the wafer surface to remove the adhered protective film with the extra removing tape.

The second type of protective film separator applies a piece of a heat-activated adhesive tape to a protective film adhered to a wafer surface, and applies heat from a heater to the heat-activated adhesive tape for a few seconds so that the heat-activated adhesive tape adheres to the protective film. Thereafter, the second type of protective film separator irradiates ultraviolet rays to weaken an adhesive strength of the protective film adhered to the wafer, and a tape-removing robot finally removes the protective film with the heat-activated adhesive tape.

The two conventional types of protective film separators continuously consume extra tape, i.e. the extra removing tape and the heat-activated adhesive tape, which causes a continuous increase in the expense of raw materials.

Additionally, either the roller or the heater for removing the protective film presses against the wafer thereby generating severe stress on the wafer surface. Moreover, impurities or residue stained in the protective film can cause damage to the patterned wafer by virtue of the physical contact, which further adversely affects the final wafer yields.

SUMMARY OF THE INVENTION

To overcome the above described problems, a feature of a preferred embodiment of the present invention provides a protective film separator for removing a protective film, wherein the protective film separator removes the protective film in a semiconductor wafer backside grinding process, thereby eliminating the need for extra removing tape or heat-activated adhesive tape so that the cost of raw materials may be reduced.

Another feature of an embodiment of the present invention provides a protective film separator that reduces an external force applied to a wafer, thereby preventing a patterned side of the wafer from obtaining impurities while the protective film is removed.

In order to achieve the above feaures, preferred embodiments of the present invention provide a protective film separator comprising an adsorption means and a peeling means. The adsorption means applys a vacuum to a part of a protective film adhered to an electric circuit patterened side of a wafer, and separates the part of the protective film from the patterned side of the wafer. The peeling means presses each side of a part of the protective film that has been separated from the wafer by the adsorption means and separates unpeeled parts of the protective film from the patterned side of the wafer.

The peeling means includes a body, top-peeling rods installed in a side of the body, and a bottom-peeling rod. The bottom-peeling rod vertically penetrates the body, moves vertically through the body, and confronts the top-peeling rods in a predetermined interval.

In addition, the top-peeling rods include two top-peeling rods placed apart from each other in a predetermined interval so that the adsorption means is located between a first top-peeling rod and a second top-peeling rod.

The adsorption means includes an adsorption plate in a semi-lunar shape to adhere closely to a rounded edge area of the wafer. The adsorption means also rotates a predetermined angle after adhering to the protective film.

These and other features and aspects of the present invention will be readily apparent to those of ordinary skill in the art upon review of the detailed description that follows." at the end of the Summary of the Invention.

BRIEF DESCRIPTION OF THE DRAWINGS

The foregoing and other features and advantages of the present invention will become more apparent by describing in detail preferred embodiments thereof as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFFERED EMBODIMENTS

Korean Patent Application No. 2001-2681, filed on Jan. 17, 2001, and entitled: "Protective Film Separator in Semiconductor Wafer Grinding Process", is incorporated by reference herein in its entirety.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those of ordinary skill in the art.

In general, a semiconductor process includes a single crystal silicon growing process, a device design process, a fabrication FAB process, an assembly process, and an inspection process. The single crystal silicon growing process produces a single crystal silicon ingot with a high purity and slices the single crystal silicon ingot may be sliced into many wafers. After generating photo masks of each layer for a device, the fabrication FAB process employs photo masks to produce electrical circuits on the wafer by generating and etching various layers on the wafer surface. The patterned wafer is sliced into numerous devices during an assembly process so that each of the devices may be combined with a lead frame.

After the wafer fabrication process to pattern an electrical circuit on the wafer surface is performed, a grinding process employing a wafer protective film polishes a thick wafer into a thinner wafer so that electrical conductivity and heat conductivity may be improved simultaneously.

A protective film is adhered to the wafer surface to protect the patterned electrical circuit on the wafer surface from impurities resulting from the grinding process. The protective film is removed when the grinding process is completed.

Figure 1:
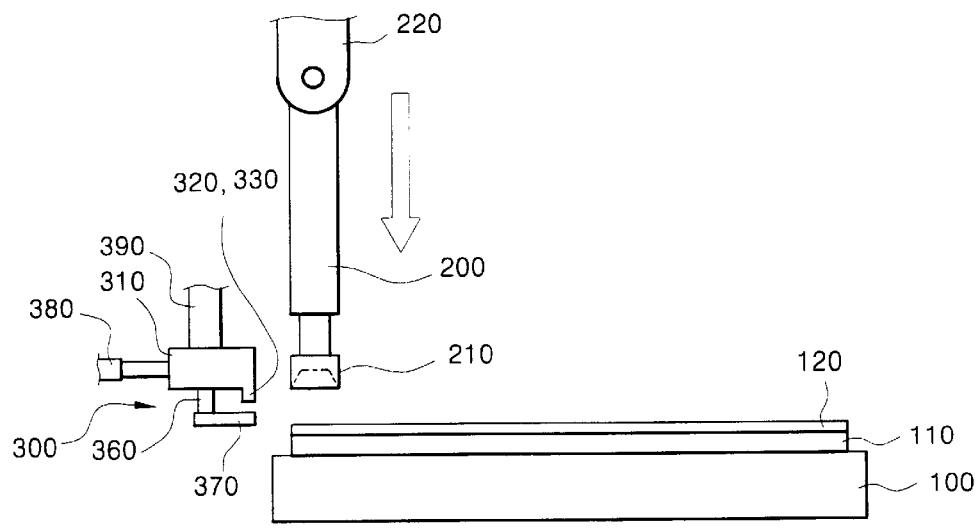
FIG. 1 illustrates a pre-operational state of a protective film separator for removing a protective film according to a preferred Embodiment of the present invention.

As illustrated in FIG. 1, the protective film separator according to the present invention comprises a vacuum adsorber 200 and a peeling arm 300.

The configuration of the vacuum adsorber 200 will now be explained. A chuck table 100 can move vertically to load a wafer 110. The vacuum adsorber 200 equipped on an upper side of the chuck table 100 can move vertically and horizontally to remove a protective film 120 adhered to a topside of the wafer 110. A flexible apparatus 220 installed on a top end of the vacuum adsorber 200 moves and rotates the vacuum adsorber 200 vertically and horizontally.

A semi-lunar shaped adsorption plate 210 equipped at the bottom end of the vacuum adsorber 200 absorbs only a part of an edge area of the wafer 110. The peeling arm 300 installed nearby the chuck table 100 moves along the upper side of the chuck table 100, and removes the protective film 120.

Figure 7:
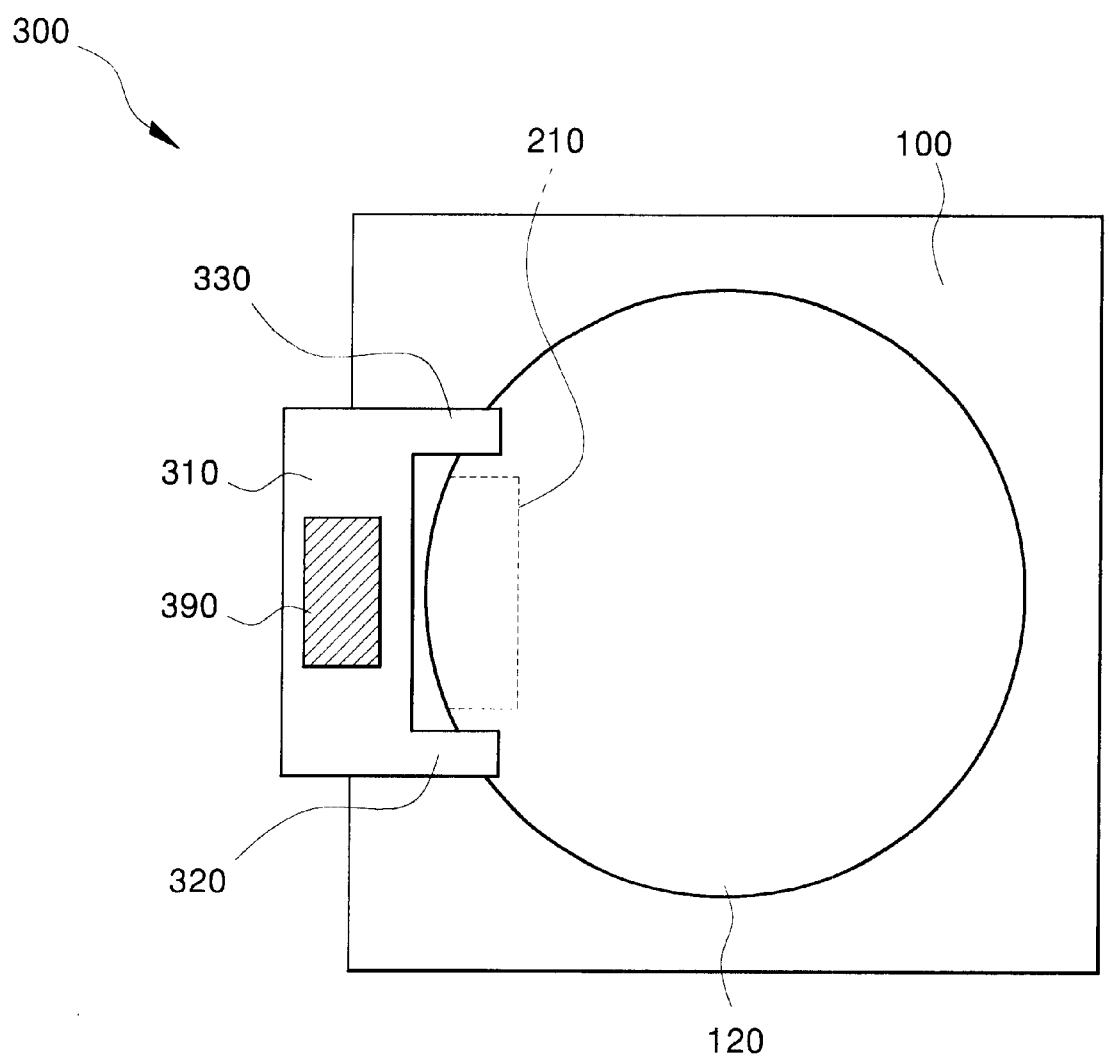
FIG. 7 illustrates a plan view of a protective film separator according to the present invention in a state where the vacuum adsorber absorbs the part of the protective film and a peeling arm simultaneously catches the part of the protective film.
Figure 8:
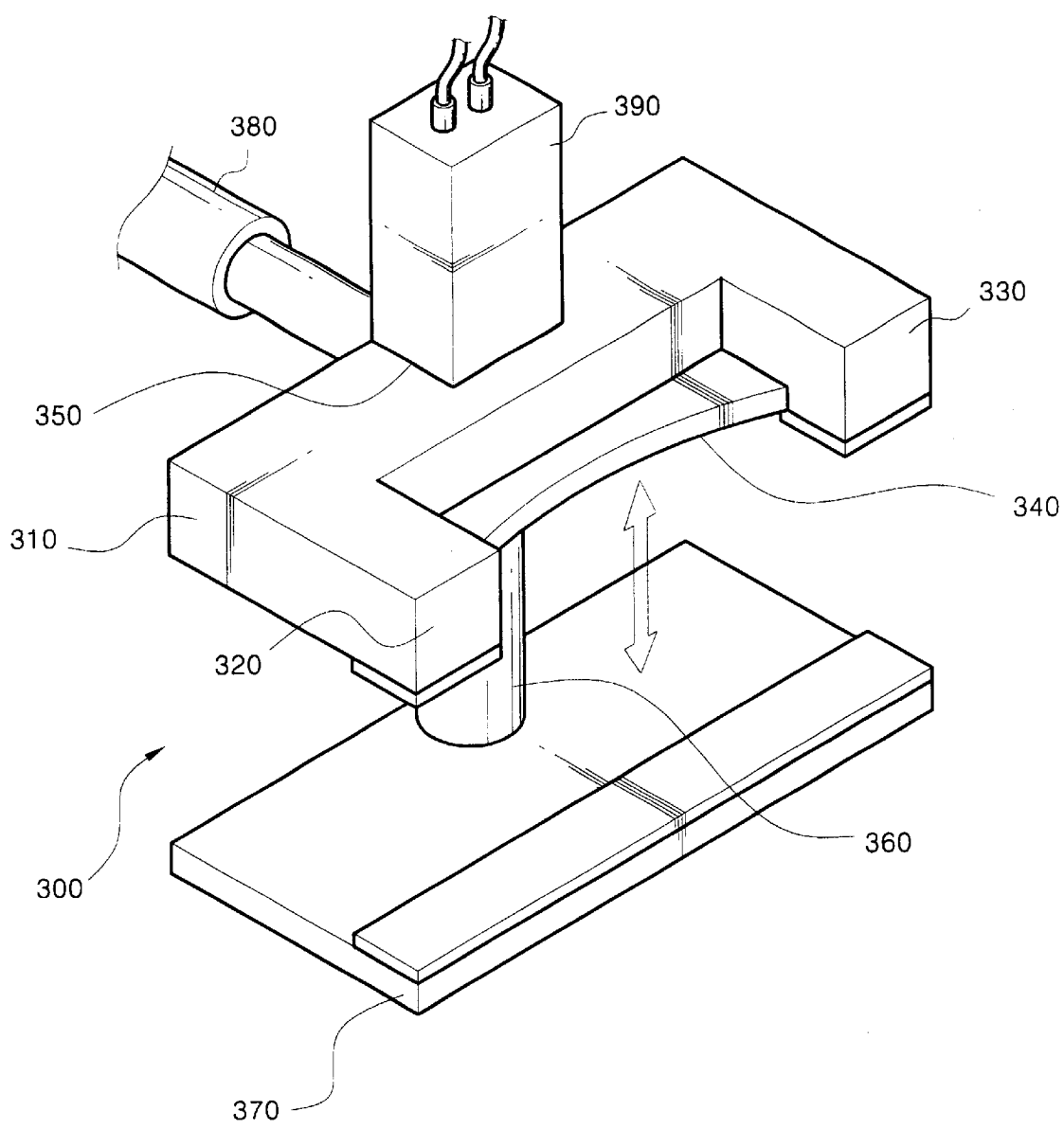
FIG. 8 illustrates a perspective view of the peeling arm of the protective film separator for removing a protective film according to the present invention.

Still referring to FIG. 1, but also illustrated in FIG. 7 and FIG. 8, the peeling arm 300 with a body 310 in a hexagonal shape includes a first top-peeling rod 320 and a second top-peeling rod 330. The first top-peeling rod 320 and the second top-peeling rod 330 protrude from both sides of the body 310 toward the upward facing side of the wafer 110. A width between the first top-peeling rod 320 and the second top-peeling rod 330 is sufficient to accommodate the adsorption plate 210 of the vacuum adsorber 200. A concave surface 340 (see FIG. 8) in a side of the body 310 formed between the first top-peeling rod and the second top-peeling rod corresponds to the semi-lunar shaped adsorption plate 210 of the vacuum adsorber 200 so that the adsorption plate 210 may be accomodated between the two top-peeling rods.

A penetration hole 350 (see FIG. 8) in a center of the body 310 equips a driving cylinder 390. The driving cylinder 390 can move a driving rod 360 installed in a bottom side of the driving cylinder 390 in a vertical direction.

A bottom-peeling rod 370 with a considerable width is located at a bottom end of the driving rod 360 and protrudes in a same direction as the first top-peeling rod 320 and the second top-peeling rod 330.

Therefore, a distance between the bottom-peeling rod 370 and the two top-peeling rods 320 and 330 can be changed reversibly to catch the protective film 120, while the body 310 halts and the driving rod 360 moves vertically. A transfer cylinder 380 allows the body 310 to move horizontally along the upper side of the wafer 110.

According to a preferred embodiment of the present invention, a transfer apparatus that moves the body 310 horizontally may employ a transfer robot with a multi-axis arm structure besides the transfer cylinder 380, and may also employ different types of apparatuses.

Referring to FIG. 1–FIG. 6, an operation of the protective film separator for removing a wafer protective film according to a preferred embodiment of the present invention will now be described.

FIG. 1 illustrates a view of a pre-operational state of the protective film separator for removing the protective film according to a preferred embodiment of the present invention. The wafer 110 illustrated in FIG. 1 is loaded on the table 100 after a wafer grinding process is performed. At this time, the vacuum adsorber 200 is placed at an upper side of an edge area of the wafer 110, and the peeling arm 300 is located outside of the wafer 110.

Figure 2:
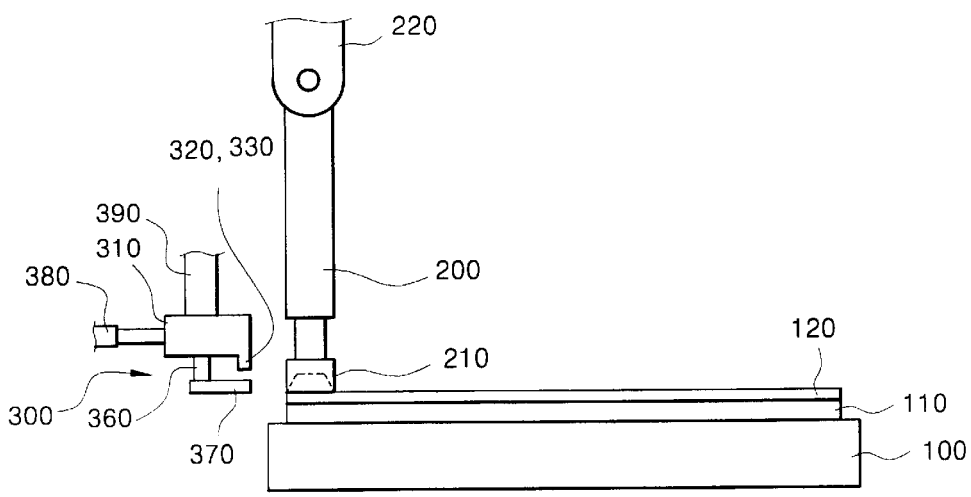
FIG. 2 illustrates a protective film separator according to the present invention in a state where adsorption plate of a vacuum adsorber absorbs a part of the protective film adhered to a wafer.

FIG. 2 illustrates the next operation. The vacuum adsorber 200 moves down so that the adsorption plate 210 of the vacuum adsorber 200 may adhere closely to the edge area of the wafer 110. Then, the vacuum adsorber 200 applies a vacuum as an adsorption force to the protective film 120, thereby allowing the adsorption plate 210 to apply an upward external adsorption force to the protective film 120.

Figure 3:
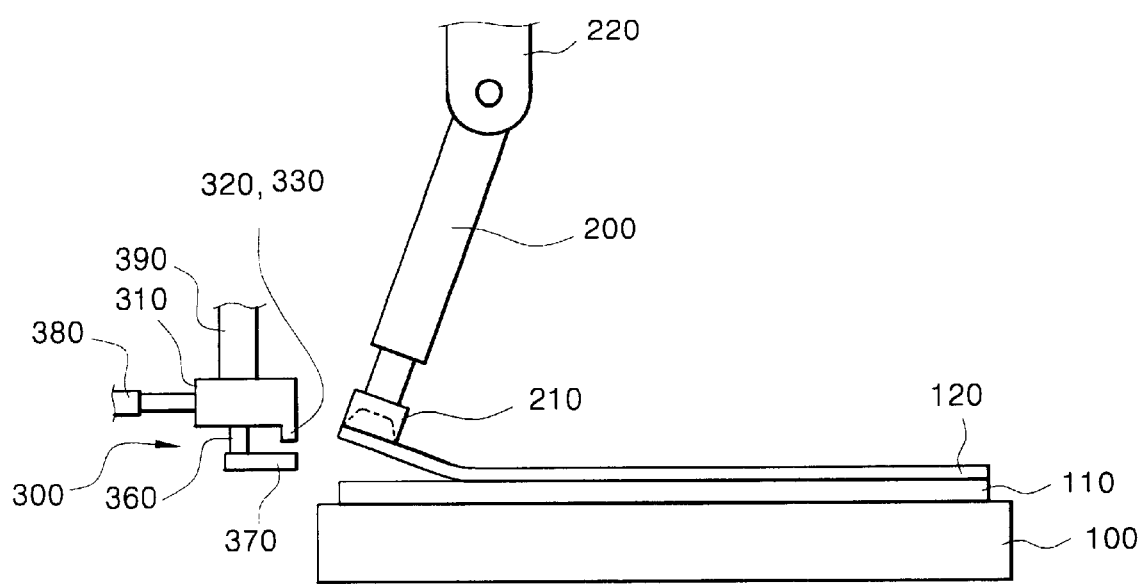
FIG. 3 illustrates a protective film separator according to the present invention in a state where the vacuum adsorber moves and rotates in a predetermined angle.

When the adsorption force is supplied to the protective film 120 through the vacuum adsorber 200, the vacuum adsorber 200 adsorbs the protective film 120 as illustrated in FIG. 3, and rotates a predetermined angle to the inside of the wafer 110 by the flexible apparatus 220 installed at a top end of the vacuum adsorber 200.

Preferably, the predetermined angle of rotation in the vacuum adsorber 200 is around 20°. Then, the adsorption plate 210 peels a part of the protective film 120 off the surface of the wafer 110.

Figure 4:
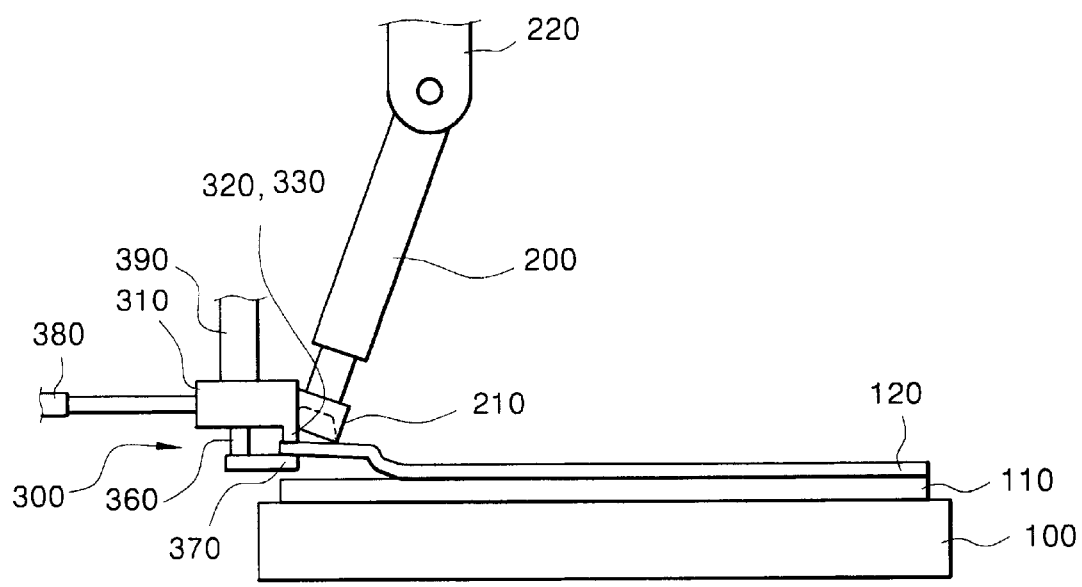
FIG. 4 illustrates a protective film separator according to the present invention in a state where the vacuum adsorber absorbs the part of the protective film and a peeling arm simultaneously catches the part of the protective film.

When a part of the protective film 120 is peeled off, as illustrated in FIG. 4, the body 310 moved by the driving cylinder 390 places the peeling rods 320, 330 and 370 of the peeling arm 300 on surfaces of the peeled part of the protective film 120.

Then, the adsorption plate 210 of the vacuum adsorber 200 is placed in the concave surface 340 (see FIG. 8) of the body 310 between the two peeling rods 320 and 330. When the driving cylinder 390 moves the driving rod 360 in an upward direction, the bottom-peeling rod 370 also moves in an upward direction, so that the peeled part of the protective film 120 is pressed between the upper and lower peeling rods 320, 330 and 370.

Figure 5:
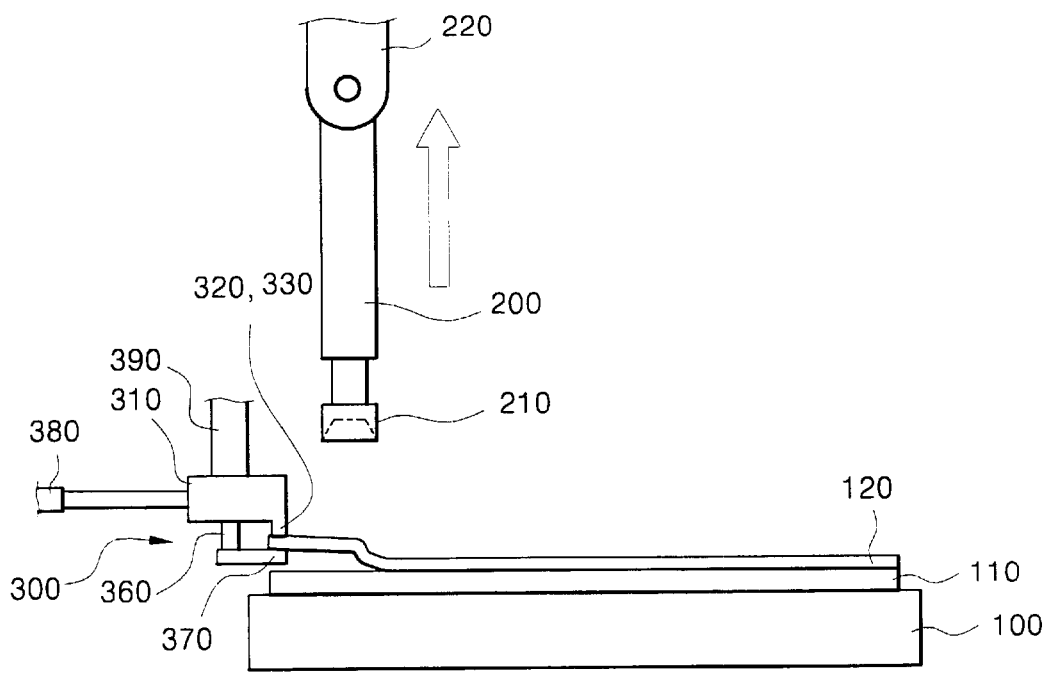
FIG. 5 illustrates a protective film separator according to the present invention in a state where the vacuum adsorber is separated from the part of the protective film, while the peeling arm catches the part of the protective film.

As illustrated in FIG. 5, the vacuum adsorber 200 no longer applies the adsorption force to the protective film 120, and is separated from the protective film 120.

Figure 6:
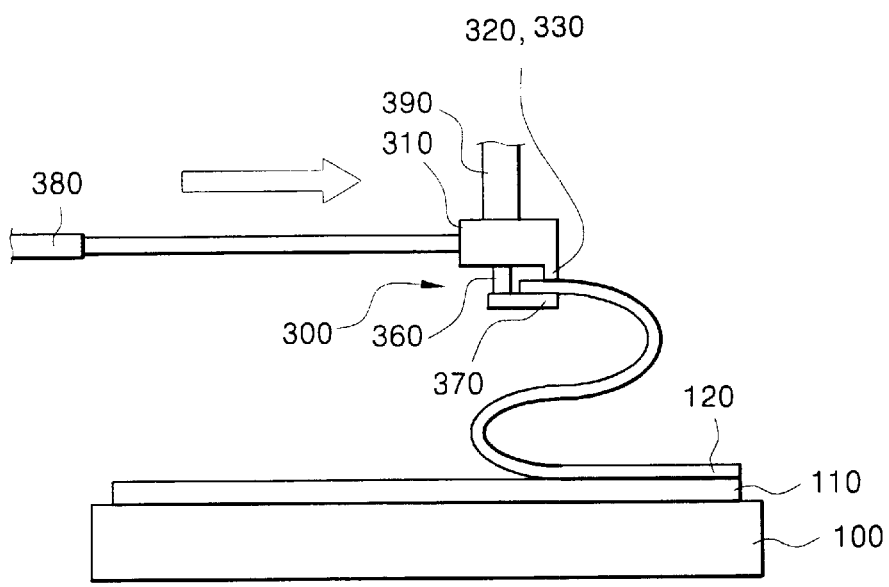
FIG. 6 illustrates a protective film separator according to the present invention in a state where the peeling arm moves to separate remaining parts of the protective film from the wafer.

Finally, as illustrated in FIG. 6, the vacuum adsorber 200 is moved to an initial position, and the peeling rods 320, 330 and 370 in the peeling arm 300 press the peeled part of the protective film 120, and move in a direction of the unpeeled protective film 120 by the transfer cylinder 380. Therefore, the peeling rods 320, 330 and 370 peel the adhered protective film 120 off the surface of the wafer 110 and remove the protective film 120 from the wafer 110.

As described in the above statements, the protective film separator for removing a wafer protective film comprises the vacuum adsorber 200 and the peeling arm 300 pressing a peeled part of the protective film 120 to remove an unpeeled part of the protective film 120.

Therefore, the protective film separator for removing a wafer protective film according to a preferred embodiment of the present invention does not employ extra removing tape or heat-activated adhesive tape to remove a protective film after the wafer grinding process. As a result, expenses for raw materials in a semiconductor fabrication process are reduced. In addition, the external force on the wafer is reduced and a patterned surface of a wafer can be better protected from impurities, and thereby improve semiconductor wafer fabrication yields.

A preferred embodiment of the present invention has been disclosed herein and, although specific terms are employed, they are used in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. A protective film separator in a semiconductor wafer grinding process, the protective film separator comprising:

an adsorption means applying a vacuum to a part of a protective film adhered in an electrical circuit patterned side of a wafer, and separating the part of the protective film from the patterned side of the wafer; and a peeling means pressing each side of the part of the protective film separated from the wafer by the adsorption means, and separating unpeeled parts of the protective film from the patterned side of the wafer.

2. The protective film separator of claim 1, wherein the peeling means comprises:

a body;

more than one top-peeling rod installed on a side of the body; and a bottom-peeling rod penetrating the body vertically, moving vertically through the body, and confronting the top-peeling rod in a predetermined interval.

3. The protective film separator of claim 2, wherein the top-peeling rods include a first top-peeling rod and a second top-peeling rod placed a predetermined distance apart from each other so that the adsorption means may be located between the first top-peeling rod and the second top-peeling rod.

4. The protective film separator of claim 1, wherein the adsorption means includes a semi-lunar shaped adsorption plate to adhere closely to a rounded edge area of the wafer.

5. The protective film separator of claim 2, wherein the adsorption means includes a semi-lunar shaped adsorption plate to adhere closely to a rounded edge area of the wafer.

6. The protective film separator of claim 1, wherein the adsorption means rotates a predetermined angle after adhering to the protective film.

* * * * *